United States Patent
Ishikawa et al.

(10) Patent No.: US 9,347,786 B2
(45) Date of Patent: May 24, 2016

(54) INTERSECTION GUIDE SYSTEM, METHOD, AND PROGRAM

(71) Applicant: AISIN AW CO., LTD., Anjo-shi, Aichi-ken (JP)

(72) Inventors: Ken Ishikawa, Nagoya (JP); Kosei Mino, Okazaki (JP); Yoshito Kondo, Anjo (JP); Saki Osoko, Okazaki (JP); Yumie Arai, Tokyo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/413,811

(22) PCT Filed: Mar. 18, 2013

(86) PCT No.: PCT/JP2013/057641
§ 371 (c)(1),
(2) Date: Jan. 9, 2015

(87) PCT Pub. No.: WO2014/024512
PCT Pub. Date: Feb. 13, 2014

(65) Prior Publication Data
US 2015/0198456 A1 Jul. 16, 2015

(30) Foreign Application Priority Data
Aug. 10, 2012 (JP) ................... 2012-178815

(51) Int. Cl.
*G01C 21/00* (2006.01)
*G01C 21/36* (2006.01)
(Continued)

(52) U.S. Cl.
CPC ........ *G01C 21/3632* (2013.01); *G01C 21/3635* (2013.01); *G01C 21/3647* (2013.01); *G01C 21/3655* (2013.01); *G01C 21/3658* (2013.01); *G09B 29/007* (2013.01); *G09B 29/106* (2013.01)

(58) Field of Classification Search
CPC ........... G01C 21/3632; G01C 21/3647; G01C 21/3655; G01C 21/3658; G09B 29/106
USPC .......................................... 701/437
See application file for complete search history.

(56) References Cited

U.S. PATENT DOCUMENTS

| 6,360,168 B1 | 3/2002 | Shimabara |
| 6,762,696 B2 | 7/2004 | Hulverscheidt et al. |

(Continued)

FOREIGN PATENT DOCUMENTS

| JP | A-7-262492 | 10/1995 |
| JP | A-2001-082969 | 3/2001 |

(Continued)

OTHER PUBLICATIONS

International Search Report issued in International Patent Application No. PCT/JP2013/057641 mailed Jun. 11, 2013 (with translation).

(Continued)

*Primary Examiner* — Hussein A. Elchanti
(74) *Attorney, Agent, or Firm* — Oliff PLC

(57) ABSTRACT

Intersection guide systems, methods, and programs acquire information on a vehicle path, acquire a vehicle travel direction at a guide intersection ahead of the vehicle based on the information on the path, and cause a display to transition from a first display state to a second display state when a degree of approach of the vehicle to the guide intersection becomes equal to or more than a threshold. In the first display state, the display displays a guide image that represents the travel direction superimposed on a portion of a forward scene ahead of the vehicle other than the guide intersection, and displays a connection line image superimposed on the forward scene that connects between the guide intersection in the forward scene and the guide image. In the second display state, the display displays the guide image superimposed on the guide intersection in the forward scene.

13 Claims, 5 Drawing Sheets

(51) Int. Cl.
 *G09B 29/10* (2006.01)
 *G09B 29/00* (2006.01)

(56) References Cited

U.S. PATENT DOCUMENTS

| | | | |
|---|---|---|---|
| 8,239,131 B2 | 8/2012 | Kindo et al. | |
| 2006/0195257 A1 | 8/2006 | Nakamura | |
| 2008/0208450 A1* | 8/2008 | Katzer | G01C 21/3635 701/533 |
| 2009/0132161 A1 | 5/2009 | Akita et al. | |
| 2009/0187335 A1* | 7/2009 | Muhlfelder | G01C 21/3635 701/532 |
| 2009/0240426 A1* | 9/2009 | Akita | G01C 21/3647 701/533 |
| 2009/0240431 A1* | 9/2009 | Chau | G01C 21/3647 701/532 |
| 2010/0131190 A1 | 5/2010 | Terauchi et al. | |
| 2010/0161208 A1 | 6/2010 | Akita et al. | |
| 2010/0217513 A1 | 8/2010 | Takeda | |
| 2010/0250116 A1 | 9/2010 | Yamaguchi et al. | |
| 2010/0256900 A1* | 10/2010 | Yamaguchi | G01C 21/36 701/533 |
| 2011/0040480 A1* | 2/2011 | Tebbutt | G01C 21/00 701/431 |
| 2011/0103651 A1* | 5/2011 | Nowak | G01C 21/3647 382/106 |
| 2011/0109618 A1* | 5/2011 | Nowak | G01C 21/3647 345/419 |
| 2011/0153200 A1* | 6/2011 | Tsuji | G01C 21/3658 701/533 |
| 2011/0215950 A1 | 9/2011 | Wagner et al. | |

FOREIGN PATENT DOCUMENTS

| | | |
|---|---|---|
| JP | A-2002-013944 | 1/2002 |
| JP | A-2005-265573 | 9/2005 |
| JP | 2006/189310 A | 7/2006 |
| JP | A-2008-122150 | 5/2008 |
| JP | A-2008-128827 | 6/2008 |
| JP | A-2010-127685 | 6/2010 |
| JP | A-2010-181363 | 8/2010 |
| WO | 2007/077829 A1 | 7/2007 |

OTHER PUBLICATIONS

Aug. 31, 2015 Office Action issued in U.S. Appl. No. 14/413,842.
U.S. Appl. No. 14/413,842, filed Jan. 9, 2015 in the name of Ishikawa.

* cited by examiner

INTERSECTION GUIDE SYSTEM, METHOD, AND PROGRAM

TECHNICAL FIELD

Related technical fields include intersection guide systems, methods, and programs that provide guidance on the travel direction at an intersection.

BACKGROUND

There is known a technology for displaying a guide image of an intersection and a cylindrical leader line that extends from a predetermined position in the intersection to the guide image on a map image drawn three-dimensionally on the basis of a viewpoint position taken in the case where a user looks forward from a driver's seat (see Japanese Patent Application Publication No. 2001-82969 (JP 2001-82969 A)). In the guide image, a lane to which a vehicle is guided at the intersection is represented in a striking color, which allows recognizing a desirable lane at the intersection correlated with the guide image by the leader line. This allows recognizing that the travel direction to be taken at the intersection is the direction corresponding to the lane to which the vehicle is guided. In Patent Document 1, in addition, the travel direction at the intersection is also guided by affixing an arrow image onto the intersection. Because an image of the intersection and the arrow image can be contrasted with each other, it is possible to easily recognize that the road, an image of which is present in the direction indicated by the arrow image, among roads connected to the intersection, is the road for exit.

SUMMARY

In Patent Document 1, however, the guide image from which the leader line extends to the intersection and the arrow image affixed onto the intersection are displayed at the same time. Thus, the driver may be confused about which of the guide image from which the leader line extends to the intersection and the arrow image affixed onto the intersection to visually recognize.

When the vehicle is close to the intersection, it is possible to clearly recognize connected roads connected to the intersection over the windshield. Therefore, it is necessary to recognize which is the connected road for exit, among the connected roads being recognized, so that the vehicle will not take a wrong connected road. Thus, when the vehicle is close to the intersection, it is necessary to cause the driver to recognize which is the connected road for exit, among the connected roads connected to the intersection. In order to recognize which is the connected road for exit, among the connected roads connected to the intersection, it is desirable to visually recognize the arrow image affixed onto the intersection. This is because it allows easily recognizing that the vehicle should exit to the connected road, an image of which is present ahead in the travel direction indicated by the image of the intersection and the arrow image. Nevertheless, the guide image from which the leader line extends is displayed even when the vehicle is close to the intersection, and therefore it is confusing which of the guide image and the arrow image to visually recognize.

When the vehicle is not close to the intersection, on the other hand, the driver does not clearly recognize connected roads connected to the intersection. Therefore, it is less necessary to cause the driver to recognize which is the connected road for exit, among the connected roads connected to the intersection. When the vehicle is not close to the intersection, further, the image of the intersection is small and difficult to visually recognize. Therefore, the travel direction at the intersection can be understood more reliably by recognizing the guide image from which the leader line extends to the intersection than by recognizing the arrow image affixed onto the intersection. That is, when the vehicle is not close to the intersection, the arrow image affixed onto the intersection is displayed even though it is desirable for the driver to visually recognize the guide image from which the leader line extends to the intersection, and therefore it is confusing which of the guide image and the arrow image to visually recognize.

Exemplary embodiments of the broad inventive principles described herein provide a technology that allows visual recognition, without confusion, of a guide image that provides guidance that is suitable for the degree of approach to a guide intersection.

According to embodiments, path information acquisition means acquires information on a path of a vehicle. Travel direction acquisition means acquires a travel direction of the vehicle at a guide intersection ahead of the vehicle on the basis of the information on the path. Display control means causes a display state on a display section to transition from a first display state to a second display state in the case where a degree of approach of the vehicle to the guide intersection becomes equal to or more than a threshold. In the first display state, the display control means causes the display section to display a guide image that represents the travel direction as superimposed on a portion of a forward scene ahead of the vehicle other than an image of the guide intersection, and causes the display section to display a connection line image as superimposed on the forward scene, the connection line image connecting between the image of the guide intersection in the forward scene and the guide image. In the second display state, the display control means causes the display section to display the guide image as superimposed on the image of the guide intersection in the forward scene.

In the configuration described above, the display control means causes the display state on the display section to transition from the first display state to the second display state in the case where the degree of approach to the guide intersection becomes equal to or more than the threshold. When the degree of approach to the guide intersection is less than the threshold, that is, when the image of the guide intersection is still small in the forward scene, the display control means brings the display state on the display section into the first display state. In the first display state, the display control means does not superimpose the guide image on the image of the guide intersection, but superimposes the guide image on a portion of the forward scene other than the image of the guide intersection. Thus, it is possible to secure the size of the guide image, without being constrained by the size of the image of the guide intersection, when the image of the guide intersection is still small in the forward scene. Therefore, the driver can be caused to reliably understand the travel direction at the guide intersection when the vehicle is not close to the guide intersection. Since the connection line image is connected to the image of the guide intersection, in addition, the driver can be caused to reliably understand the position of the guide intersection as well.

When the degree of approach to the guide intersection is equal to or more than the threshold, that is, when the image of the guide intersection can be clearly recognized in the forward scene, and it should be recognized which is the road for exit, among roads connected to the guide intersection, on the other hand, the display control means brings the display state on the display section into the second display state. In the second display state, the display control means superimposes the guide image on the image of the guide intersection in the forward scene. Thus, when the vehicle is close to the guide intersection, the image of the guide intersection, which has become larger, and the travel direction represented by the guide image can be directly contrasted with each other, which allows easily recognizing the road, an image of which is located ahead in the travel direction represented by the guide image, as the road for exit.

Guidance on the travel direction at the guide intersection can be provided in a display manner that is suitable for the degree of approach to the guide intersection by causing a transition from the first display state to the second display state as described above. In the first display state, the guide image is not superimposed on the image of the guide intersection in the forward scene. Thus, the guide image superimposed on a portion of the forward scene other than the image of the guide intersection can be visually recognized, without confusion, when the degree of approach to the guide intersection is less than the threshold. In the second display state, similarly, the guide image is not superimposed on a portion of the forward scene other than the image of the guide intersection. Thus, the guide image superimposed on the image of the guide intersection in the forward scene can be visually recognized, without confusion, when the degree of approach to the guide intersection is equal to or more than the threshold.

Further, the image of the guide intersection and the travel direction at the guide intersection can be recognized as correlated with each other in the forward scene in either of the first display state and the second display state. This is because the image of the guide intersection and the guide image are connected to each other by the connection line image in the first display state, and the guide image is superimposed on the image of the guide intersection in the second display state. Thus, the position of the image of the guide intersection and the travel direction at the guide intersection can be recognized as correlated with each other continuously even if a transition is made from the first display state to the second display state.

The path information acquisition means may acquire information on a path which allows specifying a guide intersection on the path and the travel direction at the guide intersection on the path. The information on a path acquired by the path information acquisition means may be information on a path for reaching a destination location, for example. The travel direction acquisition means may acquire, as the travel direction at the guide intersection, an entry direction for entry into the guide intersection and an exit direction for exit from the guide intersection. The term "guide intersection ahead of the vehicle" refers to an intersection on the path that the vehicle is expected to travel through. The guide intersection is a guide target intersection, and may be an intersection at which the driver may misunderstand the travel direction. As a matter of course, the path information acquisition means may determine all the intersections on the path that the vehicle is expected to travel through as the guide intersection.

The degree of approach is an index that indicates how close the vehicle is to the guide intersection, and a variety of indexes can be adopted as the degree of approach. For example, the degree of approach may be larger as a remaining distance, which is the distance from the vehicle to the guide intersection, is shorter, and the degree of approach may be larger as a period required until the guide intersection is reached is shorter. In the case where the position of the image of the guide intersection in the forward scene is required in the process by the display control means, the display control means may specify the position of the image of the guide intersection on the basis of the position (center position) of an intersection specified in node data of map information, the position (viewpoint position for the forward scene) and the direction (viewing direction for the forward scene) of the vehicle, or may specify the position of the image of the guide intersection through image recognition of an image of a feature that is peculiar to an intersection in the forward scene.

The threshold of the degree of approach may be a degree of approach at which the image of the guide intersection can be clearly recognized in the forward scene. For example, the threshold of the degree of approach may be a degree of approach at which the image of the guide intersection is larger than a predetermined size in the forward scene. In addition, the threshold of the degree of approach may be a degree of approach at which there is no image of an intersection other than the guide intersection present in the forward scene. This allows a transition to the second display state to be made when there is no possibility of erroneous recognition of an intersection, the travel direction at which is represented by the guide image.

The guide image may be an image that represents the travel direction at the guide intersection, and may be an arrow that represents the travel direction or a linear image that indicates the track of the vehicle which travels in the travel direction. In the first display state, the display control means may superimpose the guide image on a portion of the forward scene other than the image of the guide intersection, and may superimpose the guide image on a region of the forward scene above a vanishing point. There are basically no images of roads including the guide intersection present at positions in the forward scene above the vanishing point. Therefore, the guide image can be superimposed on a portion of the forward scene other than the image of the guide intersection without causing a processing load for specifying the position of the image of the guide intersection in the forward scene on the basis of the map information or through image recognition. In the second display state, on the other hand, the display control means may superimpose the guide image on the image of the guide intersection in the forward scene. In the second display state, the term "image of the guide intersection on which the guide image is superimposed" means an image of a road surface at the guide intersection. In the second display state, the shape of the road surface at the guide intersection and the travel direction represented by the guide image can be clearly contrasted with each other by superimposing the guide image on the image of the road surface at the guide intersection, rather than on the sky above the guide intersection.

The connection line image may be an image that connects between the guide image and the image of the guide intersection in a length direction, and is not limited to an image with a constant line width. If the connection line image is narrower in width than the guide image, the position of the image of the guide intersection can be represented more clearly by connecting the connection line image to the image of the guide intersection than by superimposing the guide image on the image of the guide intersection. Both ends of the connection line image in the length direction are not necessarily present on the image of the guide intersection and the guide image. For example, a gap with a predetermined length or less may be formed between an end of the connection line image in the length direction and the image of the guide intersection, and a gap with a predetermined length or less may be formed between an end of the connection line image in the length direction and the guide image. The connection line image may be a discontinuous linear image that connects between the guide image and the image of the guide intersection. For example, the connection line image may be constituted of a plurality of portions arranged in the length direction. In the first display state, the term "image of the guide intersection connected by the connection line image" means an image of a road surface at the guide intersection. In the first display state, the position of the guide intersection can be clearly represented by connecting the connection line image to the image of the road surface at the guide intersection, rather than to the sky above the guide intersection.

In the first display state, the display control means may establish a state in which both the guide image and the connection line image are superimposed on the forward scene, and may perform, either individually or collectively, a process for causing the display section to display the guide image as superimposed on the forward scene and a process for causing the display section to display the connection line image as superimposed on the forward scene. For example, the guide image and the connection line image may be superimposed on the forward scene by causing the display section to collectively display an image obtained by synthesizing the guide image and the connection line image.

The display section may display at least the guide image and the connection line image, and may display an image (hereinafter referred to as a "forward image") that represents the forward scene together with the guide image and the connection line image. That is, the display control means may superimpose the guide image and the connection line image on the forward image, and cause the display section to display the forward image. The forward image may be obtained by capturing a forward scene using a camera, and may be obtained by drawing a forward scene on the basis of the map information. Further, the display section may not display the forward image. That is, the display section may be constituted as a head-up display that displays the guide image and the connection line image as superimposed on the actual forward scene that the driver visually recognizes over the windshield of the vehicle.

Here, in the second display state, the display control means may cause the display section to display the guide image, which is analogous to the guide image displayed on the display section as superimposed on the forward scene in the first display state, as superimposed on the forward scene. Since the guide image in the first display state and the guide image in the second display state are analogous to each other, it is possible to intuitively recognize that the guide image provides guidance on the same travel direction at the same guide intersection continuously even if a transition is made from the first display state to the second display state. The feature that the guide image in the first display state and the guide image in the second display state are analogous to each other includes a feature that such guide images are congruent to each other.

More specifically, in the second display state, the display control means may cause the display section to display the guide image, which is obtained by enlarging the guide image displayed on the display section as superimposed on the forward scene in the first display state, as superimposed on the forward scene. The degree of approach is larger, and the image of the guide intersection in the forward scene is also larger, in the second display state than in the first display state. Thus, if the guide image in the second display state is larger than the guide image in the first display state, the guide image can be easily contrasted with the image of the guide intersection which is larger in the second display state. In addition, it is possible to attract attention to the guide image more strongly in the second display state in which the degree of approach is larger than in the first display state.

Further, the guide image may include an entry portion that indicates the travel direction on an entry road for entry into the guide intersection based on the information on the path, and an exit portion that indicates the travel direction on an exit road for exit from the guide intersection based on the information on the path. This allows recognizing the entry direction and the exit direction of the vehicle for entry into and exit from the guide intersection. In this case, around a transition from the first display state to the second display state, the display control means may cause the display section to display the guide image as superimposed on the forward scene such that the entry portion is maintained on the same line in the forward scene. By maintaining the entry portion of the guide image on the same line in the forward scene, it is possible to intuitively recognize that the guide image represents the entry direction for entry into the same guide intersection around a transition from the first display state to the second display state. In addition, the driver can be prevented from feeling uncomfortable about a shake of the entry portion of the guide image in the forward scene around a transition from the first display state to the second display state. The term "entry road" refers to a road that the information on the path indicates the vehicle should travel on in order to enter the guide intersection. The term "exit road" refers to a road that the information on the path indicates the vehicle should travel on in order to exit from the guide intersection.

Further, in the first display state, the display control means may cause the display section to, display the connection line image as superimposed on the forward scene such that a length of the connection line image becomes shorter as the degree of approach becomes larger. If the length of the connection line image is shortened in advance in the first display state, an impression that the connection line image vanishes at the timing of a transition from the first display state to the second display state can be lessened. In addition, as the degree of approach to the guide intersection becomes larger, the period until the vehicle travels through the guide intersection and the remaining distance from the vehicle to the guide intersection become shorter. Thus, it is possible to recognize the fact that the connection line image becomes shorter and the fact that the degree of approach to the guide intersection becomes larger as correlated with each other, which allows intuitively recognizing that the vehicle approaches the guide intersection as the length of the connection line image becomes shorter. In the case where the connection line image is constituted of a plurality of portions arranged in the length direction, the display control means may decrease the number of the plurality of portions constituting the connection line image as the degree of approach becomes larger.

In addition, in the first display state, the display control means may cause the display section to display the guide image as superimposed on a portion of the forward scene above the image of the guide intersection, and cause the display section to display the guide image as superimposed on the forward scene such that the guide image descends toward the image of the guide intersection in the forward scene as the degree of approach becomes larger. If the guide image superimposed above the image of the guide intersection descends in advance toward the image of the guide intersection in the first display state, an impression that the guide image abruptly descends onto the image of the guide intersection at the timing of a transition from the first display state to the second display state can be lessened. In addition, the guide image reaches a location on the image of the guide intersection in the second display state after the guide image gradually descends in the first display state, which allows intuitively recognizing that guidance on the travel direction at the same guide intersection is continuously provided. In addition, as the degree of approach becomes larger in the first display state, the image of the guide intersection and the guide image are arranged vertically at closer positions in the forward scene, which suppresses movement of the line of vision between the image of the guide intersection and the guide image, and easily contrasts the image of the guide intersection and the guide image with each other.

Further, in the first display state, the display control means may cause the display section to display the guide image as superimposed on the forward scene such that a size of the guide image becomes larger as the degree of approach becomes larger. This attracts attention to the guide image more strongly as the degree of approach to the guide intersection becomes larger in the first display state. In the case where the guide image in the second display state is an image obtained by enlarging the guide image in the first display state, in addition, the size of the guide image, which has become larger in the first display state, can be caused to continuously become larger also at the time of a transition from the first display state to the second display state. Thus, it is possible to intuitively recognize that guidance on the travel direction at the same guide intersection is continuously provided at the time of a transition from the first display state to the second display state.

In addition, in the second display state, the display control means may cause the display section to display the guide image as superimposed on the forward scene such that a size of the guide image becomes larger as the degree of approach becomes larger. This allows the size of the guide image to become larger so as to follow an increase in size of the image of the guide intersection in the forward scene as the degree of approach becomes larger in the second display state. Thus, it is possible to prevent the size of the image of the guide intersection and the size of the guide image, which is superimposed on the image of the guide intersection, from deviating from each other to make it difficult to contrast the image of the guide intersection and the travel direction represented by the guide image with each other.

Further, the display control means may determine that the degree of approach is equal to or more than the threshold in the case where a size of the image of the guide intersection in the forward scene is equal to or more than a predetermined value. This allows a transition to the second display state to be made when the size of the image of the guide intersection, on which the guide image is superimposed, becomes larger to make it easy to recognize the travel direction represented by the guide image. The predetermined value may be a value at which the ratio of the size of the image of the guide intersection to the size of the guide image is a predetermined ratio in the case where the guide image is superimposed.

In addition, in the first display state, the display control means may superimpose a shape image, which represents a shape of a connected road connected to the guide intersection, on the forward scene, and cause the display section to display the guide image as superimposed on the forward scene such that the guide image represents on the shape image the entry road for entry into the guide intersection based on the information on the path and the exit road for exit from the guide intersection based on the information on the path. This makes it possible to reliably understand which roads, among the connected roads connected to the guide intersection, are the entry road and the exit road in the first display state. The term "entry road" refers to a road, among the connected roads connected to the guide intersection, that the information on the path indicates the vehicle should travel on in order to enter the guide intersection. The term "exit road" refers to a road, among the connected roads connected to the guide intersection, that the information on the path indicates the vehicle should travel on in order to exit from the guide intersection.

Further, in the first display state, the display control means may superimpose, the guide image on a base image, and cause the display section to display the base image as superimposed on the forward scene. The viewability of the guide image can be secured, without depending on the color of the forward scene, by superimposing the guide image on the base image. In the second display state, on the other hand, the display control means may directly superimpose the guide image on the image of the guide intersection. This allows the guide image and the image of the guide intersection to be directly contrasted with each other, which allows intuitively recognizing the road for exit in accordance with the travel direction represented by the guide image.

In addition, the display control means may set the threshold of the degree of approach to be larger in the case where there is any non-guide target intersection present on a road between the vehicle and the guide intersection than in the case where there is no non-guide target intersection present on the road between the vehicle and the guide intersection. This allows a transition to the second display state to be made when the vehicle approaches the guide intersection to such a degree that the image of the guide intersection and the image of a non-guide target intersection can be obviously distinguished in the forward scene, or to such a degree that there is no image of a non-guide target intersection present in the forward scene. In the first display state, the image of the guide intersection can be clearly represented by the connection line image, and therefore erroneous recognition of the guide intersection can be prevented even in the case where the image of the guide intersection and the image of a non-guide target intersection are mistakable in the forward scene.

Further, the display control means may set the threshold of the degree of approach to be larger in the case where there is any obstacle present on a road between the vehicle and the guide intersection than in the case where there is no obstacle present on the road between the vehicle and the guide intersection. This makes it possible to delay a transition from the first display state to the second display state in the case where the image of the guide intersection is hidden by the obstacle. Here, in the case where a high proportion of the image of the guide intersection is hidden by the obstacle, it is difficult to recognize the travel direction by contrasting the image of the guide intersection and the guide image with each other even if a transition is made to the second display state. By delaying a transition from the first display state to the second display state, in contrast, it is possible to maintain a state in which the travel direction can be understood from the guide image superimposed on a portion other than the image of the guide intersection in the first display state. A transition can be made to the second display state when the proportion of the image of the guide intersection hidden by the obstacle is lowered so that the image of the guide intersection and the guide image can be contrasted with each other. This is because as the degree of approach to the guide intersection becomes larger, the size of the image of the guide intersection in the forward image becomes larger, which increases the possibility, that the proportion of the image of the guide intersection hidden by the obstacle is lowered.

Further, the technique for providing guidance on the travel direction at the guide intersection using the guide image can also be implemented as a program or a method. In addition, it can be assumed that the system, program, and method described above are implemented as a single device, implemented by a plurality of devices, or implemented utilizing parts that are common to various portions provided in the vehicle, and the system, program, and method include a variety of aspects. For example, a navigation system, method, and program that include the device described above can be provided. Various changes may be made. For example, some units may be implemented using software, and the others may be implemented using hardware. Further, system may be implemented as a storage medium for a program that controls the system. As a matter of course, the storage medium for the software may totally equally be a magnetic storage medium, a magneto-optical storage medium, or any storage medium that may be developed in the future.

EXEMPLARY EMBODIMENTS

Figure 1:
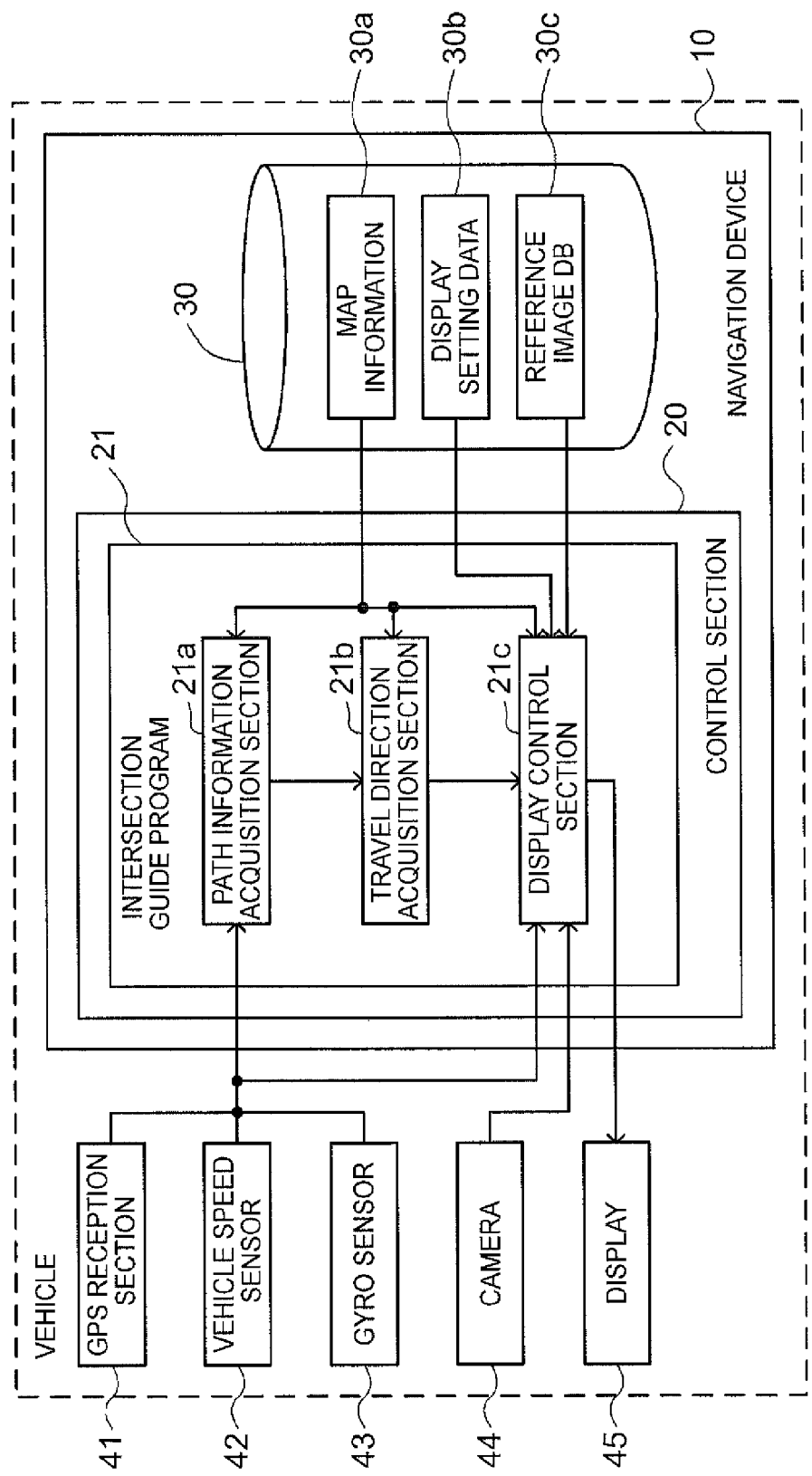
FIG. 1 is a block diagram of a navigation device.

An embodiment will be described below in the following order:
(1) Configuration of Navigation Device
  (1-1) Reference Guide Image and Reference Shape Image
  (1-2) First Display State
  (1-3) Second Display State
(2) Intersection Guide Process
(3) Other Embodiments
  (1) Configuration of Navigation Device FIG. 1 is a block diagram illustrating the configuration of a navigation device 10 serving as an intersection guide system according to an embodiment. The navigation device 10 is provided in a vehicle. The navigation device 10 includes a control section 20 and a storage medium 30. The control section 20 includes a CPU, a RANI, a ROM, etc., and executes a program stored in the storage medium 30 or the ROM. The storage medium 30 stores map information 30a, display setting data 30b, and a reference image database (DB) 30c. The map information 30a includes node data for specifying the position of nodes set in association with end points of roads (center position of intersections), link data indicating the roads between the nodes, shape interpolation point data for specifying the position of shape interpolation points set on the center line of the roads between the nodes in the width direction, and so forth. The link data include information indicating the width of the roads between the nodes. The display setting data 30b are data including various types of setting information for providing guidance display for intersections. The reference image DB 30c is data including a reference guide image that represents the travel direction at an intersection, and a reference shape image that represents the shape of a connected road connected to an intersection. The display setting data 30b and the reference guide image and the reference shape image will be discussed in detail later.

The vehicle includes a GPS reception section 41, a vehicle speed sensor 42, a gyro sensor 43, a camera 44, and a display 45. The GPS reception section 41 receives radio waves from GPS satellites to output a signal for calculating the current position of the vehicle via an interface (not illustrated). The vehicle speed sensor 42 outputs a signal corresponding to the rotational speed of wheels of the vehicle. The gyro sensor 43 outputs a signal corresponding to angular acceleration acting on the vehicle. The control section 20 specifies the current position of the vehicle on the basis of the signals output from the GPS reception section 41, the vehicle speed sensor 42, the gyro sensor 43, and so forth and the map information 30a. Further, the control section 20 specifies the current orientation, which is the orientation in which the front of the vehicle is oriented, on the basis of the signal from the gyro sensor 43, the track of the current position, and so forth.

The camera 44 is an image sensor that captures a forward scene right ahead of the vehicle to generate a forward image that represents the forward scene. The forward image captured by the camera 44 is output to the control section 20 via an interface (not illustrated). In the embodiment, the camera 44 is provided at the center position of the vehicle in the width direction. The display 45 is a video output device that outputs various types of guidance on the basis of a video signal output from the control section 20. The display 45 displays the forward image. The left-right direction of the forward image corresponds to the left-right direction of the vehicle. An image of an object positioned farther ahead from the vehicle on a road surface in the real space is positioned more above on the forward image. In addition, the center of the lower side of the forward image corresponds to the camera 44 (the current position of the vehicle), and the center line of the forward image in the lateral direction corresponds to the position right ahead of the vehicle. The optical specifications (such as the field angle, the optical axis direction, and the distortion characteristics) of the camera 44 are stored in the display setting data 30b.

The control section 20 executes an intersection guide program 21. The intersection guide program 21 includes a path information acquisition section 21a, a travel direction acquisition section 21b, and a display control section 21e.

The path information acquisition section 21a is a module that causes the control section 20 to execute a function of acquiring information on the path of the vehicle. In the embodiment, the control section 20 searches for an expected travel path for reaching a destination location on the basis of the map information 30a to acquire information indicating the expected travel path. The expected travel path is constituted of a series of roads that the vehicle should travel on in order to reach the destination location. The expected travel path may be a path acquired by the control section 20 from an external device or a removable memory via communication or the like.

The travel direction acquisition section 21b is a module that causes the control section 20 to execute a function of acquiring the travel direction of the vehicle at a guide intersection ahead of the vehicle on the basis of the information on the path. In the embodiment, the control section 20 specifies an intersection on the expected travel path that the vehicle is expected to travel through and that the vehicle turns to exit from as the guide intersection. The control section 20 specifies an entry road for entry into the guide intersection and an exit road for exit from the guide intersection on the basis of the information on the path. The entry road is a road on the expected travel path that the vehicle travels on immediately before traveling through the guide intersection. The exit road is a road on the expected travel path that the vehicle travels on immediately after traveling through the guide intersection. The control section 20 specifies the direction of a vector connecting between the position of a shape interpolation point that is the closest to the intersection, among shape interpolation points in the entry road, and the center position of the intersection as the entry direction for entry into the intersection. Similarly, the control section 20 specifies the direction of a vector connecting between the position of a shape interpolation point that is the closest to the intersection, among shape interpolation points in the exit road, and the center position of the intersection as the exit direction for exit from the intersection. The center position of the intersection and the shape interpolation points can be specified on the basis of the node data and the shape interpolation point data of the map information 30*a*. Subsequently, the control section 20, through the function of the travel direction acquisition section 21*b*, specifies a turning angle formed by the exit direction with respect to the entry direction, and specifies an intersection at which the turning angle is equal to or more than a threshold stored in the display setting data 30*b* as the guide intersection.

Figure 2A:
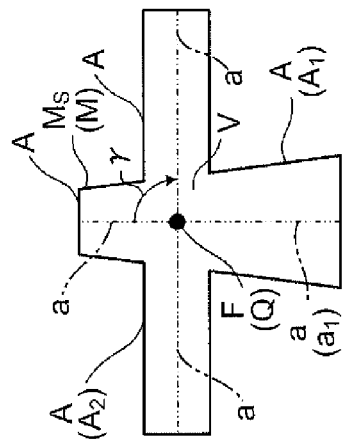
FIG. 2A is a plan view of a road.

FIG. 2A is a plan view of a road including a guide intersection C. The control section 20 acquires the entry direction $d_1$ and the exit direction $d_2$ specified for the guide intersection C as the travel direction at the guide intersection C. In the embodiment, the turning angle $\theta$ for a left turn is determined to be positive, and the turning angle $\theta$ for a right turn is determined to be negative.

The display control section 21*c* is a module that causes the control section 20 to execute a function of causing the display state on the display 45 to transition from a first display state to a second display state in the case where the degree of approach to the guide intersection C becomes equal to or more than a threshold. In the embodiment, the control section 20 uses a remaining distance S from the vehicle to the guide intersection C as an index of the degree of approach of the vehicle to the guide intersection C. The remaining distance S is an index that indicates that the degree of approach of the vehicle to the guide intersection C is larger as the value of the remaining distance S is smaller. The control section 20 specifies the linear distance from the current position of the vehicle to the guide intersection C as the remaining distance S, and determines that the degree of approach to the guide intersection C is equal to or more than a threshold in the case where the specified remaining distance S is equal to or less than a threshold $S_{th}$.

In the embodiment, the threshold $S_{th}$ of the remaining distance S is determined as the remaining distance S at the time when the size of an image of an intersection in an average shape is a predetermined size in the forward image, and stored in the display setting data 30*b*. The threshold $S_{th}$ of the remaining distance S can be set by estimating the size of an image of the intersection in the average shape in the forward image for each remaining distance S on the basis of the optical specifications of the camera 44. The intersection in the average shape may be an intersection in a square shape with four sides having a length of the average value of the width of roads specified in the map information 30*a*. The control section 20, through the function of the display control section 21*c*, brings the display state on the display 45 into the first display state in the case where the degree of approach of the vehicle to the guide intersection C is less than a threshold, that is, the remaining distance S to the guide intersection is larger than the threshold $S_{th}$. Before describing the first display state, the reference guide image and the reference shape image used in the first display state will be described.

(1-1) Reference Guide Image and Reference Shape Image

Figure 2B:
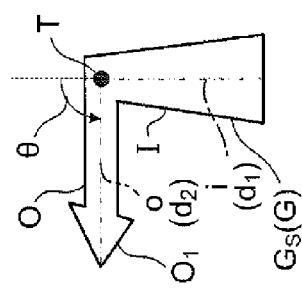
FIG. 2B illustrates a guide image.

FIG. 2B illustrates a reference guide image $G_S$. The reference guide image $G_S$ is an image obtained in the case where a virtual arrow representing the travel direction at an intersection is assumed to be viewed from above from the opposite side (front side) of the entry direction $d_1$. The reference guide image $G_S$ includes an entry portion I and an exit portion O. A center line i (dash-double-dot line) of the entry portion I in the width direction and a center line o (dash-double-dot line) of the exit portion O in the width direction intersect each other at a bent point T. A guide image G shows that the direction of the center line o of the exit portion O is varied by the turning angle $\theta$ from the direction of the center line i of the entry portion I. That is, the length direction of the entry portion I represents the entry direction $d_1$ for entry into the guide intersection C, and the length direction of the exit portion O represents the exit direction $d_2$ for exit from the guide intersection C. An arrow head portion $O_1$ is formed at the distal end of the exit portion O. The entry direction $d_1$ is represented as the longitudinal direction of the reference guide image $G_S$. The exit direction $d_2$ is represented as a direction matching the turning angle $\theta$. The entry portion I is not varied irrespective of the turning angle $\theta$.

In the reference image DB 30*c*, the reference guide image $G_S$ is stored for each bracket of the turning angle $\theta$. In the embodiment, seven brackets of the turning angle $\theta$ are defined. The median values of the brackets of the turning angle $\theta$ are defined as 0, 45, 90, 135, −45, −90, and −135 degrees. That is, in the embodiment, seven reference guide images $G_S$ are stored in the reference image DB 30*c*. FIG. 2B illustrates the reference guide image $G_S$ stored for a bracket with a median value of the turning angle $\theta$ of 90 degrees.

Figure 2C:
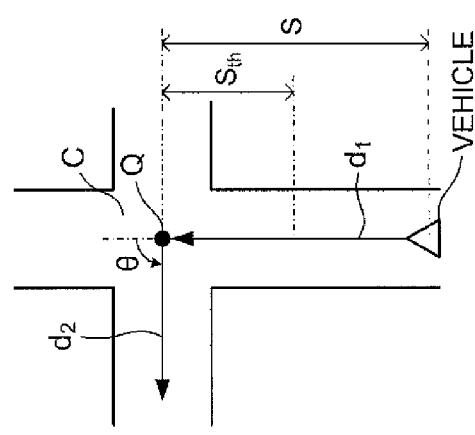
FIG. 2C illustrates a shape image.

FIG. 2C illustrates a reference shape image $M_S$. The reference shape image $M_S$ is an image obtained in the case where the schematic shape of connected roads connected to an intersection is assumed to be viewed from above from the opposite side (front side) of the entry road. In the reference shape image $M_S$, images A of the connected roads are connected to an image V of the intersection. Center lines a of the images A of the connected roads in the width direction intersect each other at a center point F. The images A of the connected roads include an image $A_1$ of the entry road. A center line $a_1$ (dash-double-dot line) of the image $A_1$ of the entry road in the width direction extends in the longitudinal direction. The direction of connection of the image A of each connected road to the image V of the intersection represents the direction of connection of each connected road to the intersection in the real space.

In the reference image DB 30*c*, the reference shape image $M_S$ is stored for each combination of the presence or absence of a connected road in each bracket of a connection angle $\gamma$ of the connected road. Here, the term "connection angle $\gamma$ of a connected road" means the angle formed by the direction of a connected road which is different from the entry road with respect to the direction of the entry road. That is, the connection angle $\gamma$ means the turning angle $\theta$ for a case where the vehicle is assumed to exit from the entry road to a connected road which is different from the entry road. FIG. 2C illustrates the connection angle $\gamma$ (−90 degrees) for a right-turning road as a connected road. The brackets of the connection angle $\gamma$ coincide with the brackets of the turning angle $\theta$. In the case where seven brackets of the turning angle $\theta$ are defined as in the embodiment, $2^7$ reference shape images $M_S$ are stored in the reference image DB 30*c*. In the shape image M of FIG. 2C, the combination of the presence or absence of a connected road in each bracket of the connection angle $\gamma$ is 0 degrees (present), 45 degrees (absent), 90 degrees (present), 135 degrees (absent), −45 degrees (absent), −90 degrees (present), and −135 degrees (absent). Because the entry road is inevitably connected to the guide intersection C, all reference shape images $M_S$ include the image $A_1$ of the entry road.

(1-2) First Display State

In the first display state, the control section 20, though the function of the display control section 21c, causes the display 45 to display a guide image that represents the travel direction at the guide intersection C as superimposed on a portion of the forward image of the vehicle other than the image of the guide intersection C, and is a module that causes the control section 20 to execute a function of causing the display 45 to display a connection line image that connects between the image of the guide intersection C in the forward image and the guide image as superimposed on the forward image. First, the guide image will be described.

The guide image is an image obtained by enlarging the reference guide image $G_S$ illustrated in FIG. 2B. In the first display state, the control section 20, though the function of the display control section 21c, causes the display 45 to display the guide image G as superimposed on the forward image such that the size of the guide image G becomes larger as the degree of approach becomes larger. That is, the control section 20 generates the guide image G with a larger size as the remaining distance S to the guide intersection C is shorter. The control section 20 acquires the magnification of the guide image G corresponding to the remaining distance S to the guide intersection C from the display setting data 30b. The control section 20 then generates the guide image G by enlarging the reference guide image $G_S$ with a magnification matching the remaining distance S.

Figure 3A:
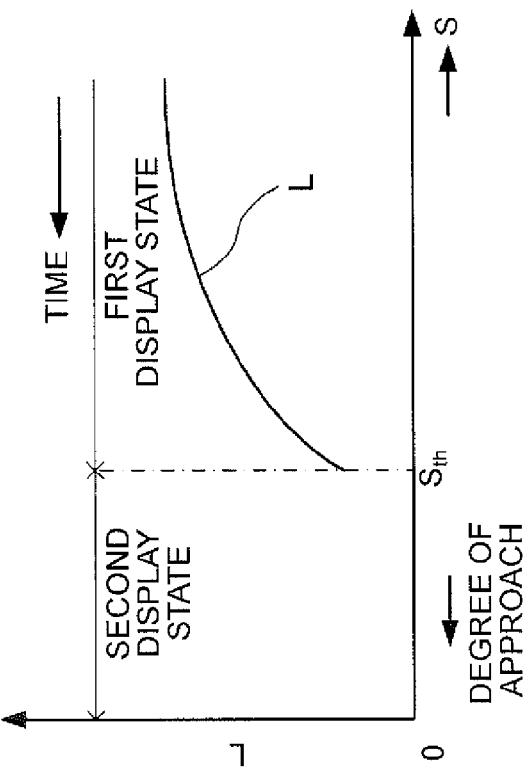
FIG. 3A is a graph illustrating the relationship between a remaining distance S and the size of the guide image.

FIG. 3A is a graph illustrating the relationship between the remaining distance S to the guide intersection C and the magnification X (solid line) of the guide image G. In FIG. 3A, the horizontal axis indicates the remaining distance S, and the vertical axis indicates the magnification X of the guide image G. A period for which the remaining distance S is larger than the threshold $S_{th}$ corresponds to a period in the first display state. A period for which the remaining distance S is 0 or more and the threshold $S_{th}$ or less corresponds to a period in the second display state. In the first display state, as illustrated in FIG. 3A, the magnification X of the guide image G becomes monotonously larger as the remaining distance S to the guide intersection C becomes shorter.

When the guide intersection C is specified, the control section 20, through the function of the display control section 21c, specifies the bracket of the turning angle θ to which the turning angle θ corresponding to the travel direction at the guide intersection C belongs, and acquires the reference guide image $G_S$ correlated with the specified bracket of the turning angle θ from the reference image DB 30c as an enlargement target. The control section 20 then acquires the magnification X corresponding to the remaining distance S from the display setting data 30b, and enlarges the reference guide image $G_S$ corresponding to the travel direction at the guide intersection C with the acquired magnification X to generate the guide image G. Thus, the size of the guide image G becomes larger as the remaining distance S becomes shorter, that is, the degree of approach becomes larger.

In the first display state, the control section 20, through the function of the display control section 21c, superimposes the shape image M, which represents the shape of the connected roads connected to the guide intersection C, on the forward image, and causes the display 45 to display the guide image G as superimposed on the forward image such that the guide image G represents on the shape image M an entry road for entry into the guide intersection C based on the information on the path and an exit road for exit from the guide intersection C based on the information on the path. When the guide intersection C is specified, the control section 20, through the function of the display control section 21c, specifies the bracket of the connection angle γ of each connected road connected to the guide intersection C, and acquires the reference shape image $M_S$ corresponding to the combination of the brackets of the connection angle γ at which the connected roads are connected from the reference image DB 30c as an enlargement target. Next, the control section 20 acquires the magnification X matching the remaining distance S from the display setting data 30b, and enlarges the reference shape image $M_S$ which represents the shape of the connected roads connected to the guide intersection C with the acquired magnification X to generate the shape image M. That is, the control section 20 generates the guide image G and the shape image M by enlarging the reference guide image $G_S$ and the reference shape image $M_S$ with the same magnification.

Figure 2D:
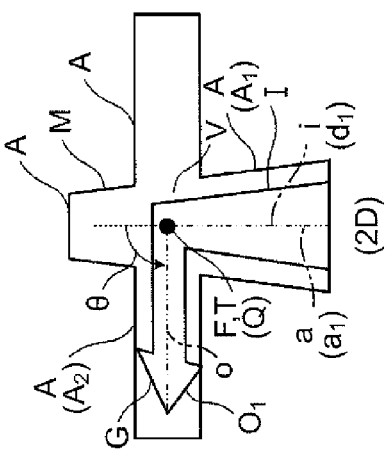
FIG. 2D illustrates the shape image on which the guide image is superimposed.

The control section 20, through the function of the display control section 21c, superimposes the guide image G on the shape image M. Specifically, the control section 20 superimposes the guide image G on the shape image M such that the bent point T of the guide image G overlaps the center point F of the shape image M. FIG. 2D illustrates the shape image M on which the guide image G is superimposed. As illustrated in the drawing, the entry portion I of the guide image G is superimposed on the image $A_1$ of the entry road of the shape image M, and the exit portion O of the guide image G is superimposed on an image $A_2$ of the exit road of the shape image M. This allows the guide image G on the shape image M to represent the entry road for entry into the guide intersection C and the exit road for exit from the guide intersection C. With the guide image G superimposed on the shape image M as described above, the lower end of the guide image G and the lower end of the shape image M (the lower end of the image $A_1$ of the entry road) are located at the same position in the longitudinal direction. That is, the reference image DB 30c stores the reference guide image $G_S$ and the reference shape image $M_S$ with the length (FIG. 2B) of the center line i of the entry portion I in the reference guide image $G_S$ and the length (FIG. 2C) of the center line $a_1$ of the image $A_1$ of the entry road in the reference shape image $M_S$ coinciding with each other.

Further, in the first display state, the control section 20, though the function of the display control section 21c, superimposes the guide image G on a base image, and causes the display 45 to display the base image as superimposed on the forward image. The control section 20 generates a base image in a shape that accommodates the guide image G and the shape image M, and in a color that is different from those of the guide image G and the shape image M. For example, the control section 20 generates a rectangular base image having the same height as the height of the shape image M and having the same width as the width of the shape image M. The control section 20 then further superimposes the shape image M, on which the guide image G is superimposed, on the base image such that the upper and lower ends of the shape image M coincide with the upper and lower ends, respectively, of the base image and such that the left and right ends of the shape image M coincide with the left and right ends, respectively, of the base image. This allows the lower end of the guide image G (the lower end of the entry portion I), the lower end of the shape image M (the lower end of the image $A_1$ of the entry road), and the lower end of the base image to be located at the same position in the longitudinal direction. It is desirable that the respective colors of the guide image G, the shape image. M, and the base image are different from each other in hue angle, saturation, and brightness by a predetermined criterion or more.

In the first display state, the control section 20, though the function of the display control section 21c, causes the display

45 to display the guide image G which represents the travel direction as superimposed on the forward image in a portion of the forward image other than the image of the guide intersection C. The control section 20 sets the position of superimposition of the guide image G to a portion of the forward image above a vanishing point W as the portion of the forward image other than the image of the guide intersection C. The height of the vanishing point W in the forward image can be specified on the basis of the optical specifications of the camera 44 stored in the display setting data 30*b*. Thus, the position of superimposition of the guide image G can be set with a low processing load.

Figure 4A:
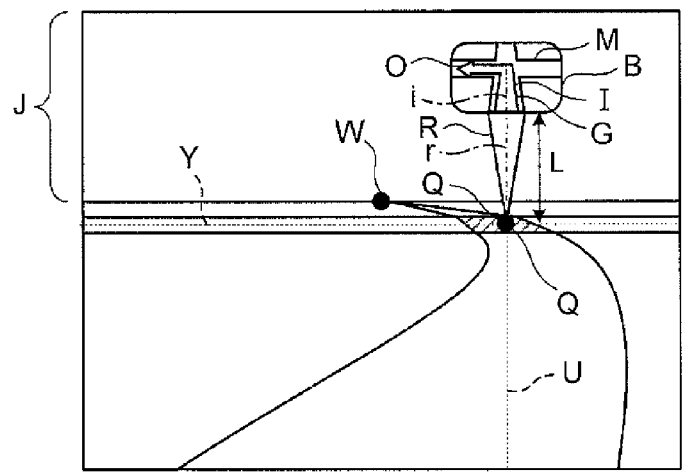
FIGS. 4A and 4B illustrate forward images in a first display state.
Figure 4B:
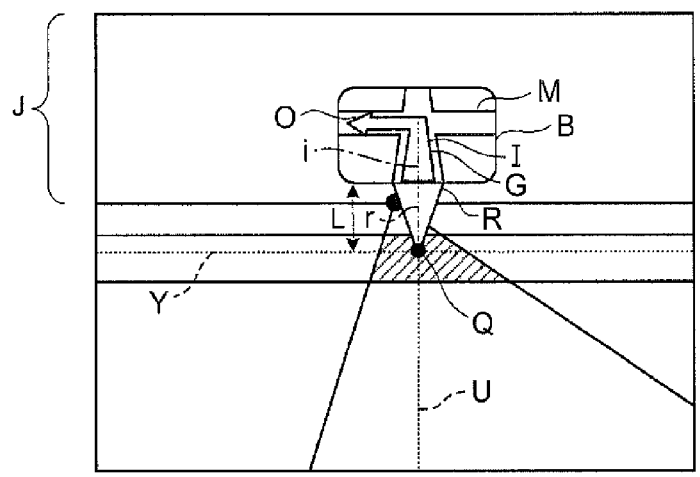

FIGS. 4A and 4B each illustrate a forward image. The forward image of FIG. 4A is a forward image displayed in the case where the remaining distance S is larger than that of the forward image of FIG. 4B. As illustrated in FIGS. 4A and 4B, there are basically no images of roads present in a region J above the vanishing point W. Therefore, the guide image G can be superimposed on a portion of the forward image other than the image of the guide intersection C (hatched). In addition, the guide image G with a larger size is superimposed on the forward image of FIG. 4B with a shorter remaining distance S compared to the forward image of FIG. 4A with a longer remaining distance S. The control section 20 may specify the position of the image of the guide intersection C in the forward image through image recognition (recognition of an image of a feature that is peculiar to the intersection) or on the basis of the map information 30*a*, and set the position of superimposition of the guide image G at a position that is different from the specified position of the image of the guide intersection C. This allows the position of superimposition of the guide image G to be secured also below the vanishing point W. In the embodiment, the position of superimposition of the guide image G depends on the connection line image R. Therefore, the position of superimposition of the guide image G will be discussed in detail later.

In the first display state, the control section 20, though the function of the display control section 21*c*, causes the display 45 to display the connection line image R, which connects between the image of the guide intersection C in the forward image and the guide image G, as superimposed on the forward image. That is, the control section 20 sets the position of one end of the connection line image R to the position of the image of the guide intersection C in the forward image, and sets the position of the other end of the connection line image R to the position of superimposition of the guide image G in the forward image. First, the control section 20 sets the position of the lower end of the connection line image R to a position in the forward image corresponding to a center position Q of the guide intersection C. The control section 20 specifies the center position Q of the guide intersection C on the basis of the node data of the map information 30*a*, and specifies the position in the forward image corresponding to the center position Q of the guide intersection C on the basis of the center position Q, the current position and the current orientation of the vehicle, and the optical specifications of the camera 44. As a matter of course, the control section 20 may specify the position corresponding to the center position Q of the guide intersection C through image recognition in the forward image. In the embodiment, the connection line image R is in the shape of an isosceles triangle with the vertex angle present on the lower side, and the height from the vertex angle to the base is defined as a length L. The connection line image R may have any linear shape that is narrower than the guide image G, and may not be in the shape of an isosceles triangle.

Figure 3B:
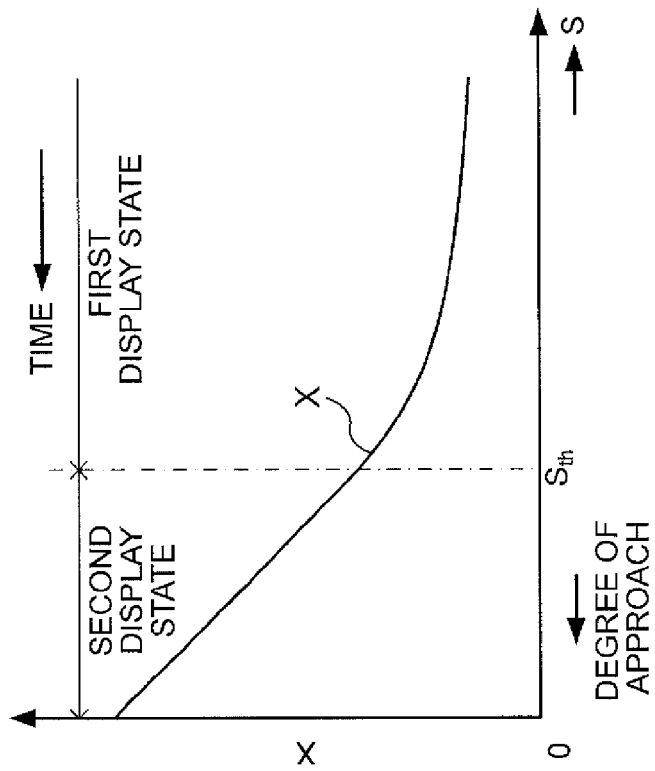
FIG. 3B is a graph illustrating the relationship between the remaining distance S and the length of a connection line image.

In the first display state, the control section 20, though the function of the display control section 21*c*, causes the display 45 to display the connection line image R as superimposed on the forward image such that the length L of the connection line image R becomes shorter as the degree of approach becomes larger. The control section 20, through the function of the display control section 21*c*, references the display setting data 30*b* to acquire the length of the connection line image R. FIG. 3B is a graph illustrating the length L (solid line) of the connection line image R specified in the display setting data 30*b*. In FIG. 3B, the horizontal axis indicates the remaining distance S, and indicates the length L of the connection line image R. In the display setting data 30*b*, as illustrated in the drawing, the length L of the connection line image R is specified so as to become shorter as the degree of approach to the guide intersection C becomes larger, that is, as the remaining distance S to the guide intersection C becomes shorter. Further, the length L of the connection line image R is specified such that the amount of decrease in length L of the connection line image R per unit amount of decrease in remaining distance S is increased as the remaining distance S becomes shorter. When the length L of the connection line image R matching the remaining distance S is acquired, the control section 20 generates the connection line image R, the height of which from the base to the vertex angle coincides with the length L.

In the first display state, the control section 20, though the function of the display control section 21*c*, causes the display 45 to display the guide image G as superimposed on the forward image such that the guide image G descends toward the image of the guide intersection C in the forward image as the degree of approach becomes larger. That is, the control section 20 sets the position of superimposition of the guide image G to a lower position in the forward image as the remaining distance S becomes shorter. Specifically, the control section 20 sets the position of superimposition of the upper end of the connection line image R to a position above a height Y of the position corresponding to the center position Q of the guide intersection C by the length L of the connection line image R, and further sets the position of the upper end of the connection line image R to the position of superimposition of the lower end of the guide image G (the shape image M, the base image B). The guide image G can be descended since the image of the guide intersection C in the forward image descends and the length L of the connection line image R becomes shorter as the remaining distance S becomes shorter. The position of superimposition of the guide image G (the shape image M, the base image B) in the longitudinal direction can be set in the manner described above.

A connection line image R with a shorter length L is superimposed on the forward image of FIG. 4B with a shorter remaining distance S compared to the forward image of FIG. 4A with a longer remaining distance. S. The guide image G is superimposed at a lower position on the forward image of FIG. 4B with a shorter remaining distance S compared to the forward image of FIG. 4A with a longer remaining distance S. As the remaining distance S to the guide intersection C becomes shorter, the position of the image of the guide intersection C in the forward image descends. Thus, in the case where the remaining distance S is the threshold $S_{th}$, the position of the image of the guide intersection C is lowest, and the length L of the connection line image R is shortest. The length L of the connection line image R is set such that the guide image G can be superimposed on the region J above the vanishing point W also in this case. Specifically, a position in the forward image corresponding to the center position Q of the intersection in the average shape for a case where the remaining distance S is the threshold $S_{th}$ is specified on the basis of the optical specifications of the camera 44. Setting is made such that the length L of the connection line image R for a case where the remaining distance S is the threshold $S_{th}$ is longer than the distance in the longitudinal 1 direction between the specified position and the vanishing point W. This allows the guide image G to be superimposed on the region J above the vanishing point W in the first display state.

The control section 20, though the function of the display control section 21c, causes the display 45 to display the connection line image R as superimposed on the forward image such that the tilt of a center line r of the connection line image R in the width direction in the forward image is kept constant. In the embodiment, the control section 20 keeps the tilt of the center line r of the connection line image R in the width direction constant by keeping the center line r of the connection line image R in the width direction extending in the longitudinal direction of the forward image (the vertical direction of the forward image). The tilt of the center line r of the connection line image R in the width direction may be kept constant with the center line r inclined with respect to the longitudinal direction of the forward image.

The control section 20, though the function of the display control section 21c, causes the display 45 to display the guide image G as superimposed on the forward image such that the entry portion I of the guide image G is superimposed on the extension line of the center line r of the connection, line image R in the width direction in the forward image. That is, the control section 20 sets the position of superimposition of the guide image G in the lateral direction such that both the center line i of the entry portion I of the guide image G in the width direction and the center line r of the connection line image R in the width direction are positioned on a reference line U (broken line). Thus, the lower end of the image $A_1$ of the entry road and the lower end of the guide image G are connected to the upper end of the connection line image R. Since the lower end of the connection line image R is set to a position in the forward image corresponding to the center position Q of the guide intersection C, the reference line U extends in the longitudinal direction to pass through a position in the forward image corresponding to the center position Q of the guide intersection C. Next, the second display state will be described.

(1-3) Second Display State

In the second display state, the control section 20, though the function of the display control section 21c, causes the display 45 to display the guide image G as superimposed on the image of the guide intersection C in the forward image. That is, in the second display state, the control section 20 does not superimpose the guide image G together with the connection line image R as in the first display state, but superimposes only the guide image G on the forward image. The size and the position of superimposition of the guide image G in the second display state will be described below.

In the second display state, the control section 20, though the function of the display control section 21c, causes the display 45 to display the guide image G, which is analogous to the guide image G displayed on the display 45 as superimposed on the forward image in the first display state, as superimposed on the forward image. More specifically, in the second display state, the control section 20 causes the display 45 to display the guide image G, which is obtained by enlarging the guide image G displayed on the display 45 as superimposed on the forward image in the first display state, as superimposed on the forward image. Also in the second display state, the guide image G is generated by a technique that is similar to that employed in the first display state. That is, the control section 20 acquires the magnification X of the guide image. G matching the remaining distance S from the display setting data 30b (FIG. 3A), and enlarges the reference guide image $G_S$ representing the travel direction at the guide intersection C with the acquired magnification X to generate the guide image G. In either of the first display state and the second display state, the guide image G obtained by enlarging the reference guide image $G_S$ is generated, and therefore the guide image G in the first display state and the guide image G in the second display state are analogous to each other.

In addition, as illustrated in FIG. 3A, the magnification X of the guide image G in the second display state is set to be larger than the magnification X of the guide image G in the first display state. Thus, the guide image G, which is obtained by enlarging the guide image G displayed in the first display state, is displayed in the second display state. In the second display state, the control section 20, though the function of the display control section 21c, causes the display 45 to display the guide image G as superimposed on the forward image such that the size of the guide image G becomes larger as the degree of approach becomes larger. As illustrated in FIG. 3A, the magnification X of the guide image G becomes larger as the degree of approach to the guide intersection C becomes larger, that is, the remaining distance S to the guide intersection C becomes shorter. That is, the control section 20 can make the size of the guide image G larger as the remaining distance S to the guide intersection C becomes shorter.

The magnification X of the guide image G in the second display state is set to have the same tilt as the tilt of the magnification with which an image of the intersection in the average shape in the forward image is enlarged in accordance with a decrease in remaining distance S. This allows the size of the guide image G to become larger so as to follow an increase in size of the image of the guide intersection C in the forward image along with a decrease in remaining distance S. The tilt of the magnification X is gentler in the first display state than in the second display state. This can prevent the size of the guide image G from becoming too small in the first display state in which the remaining distance S is long.

Figure 4C:
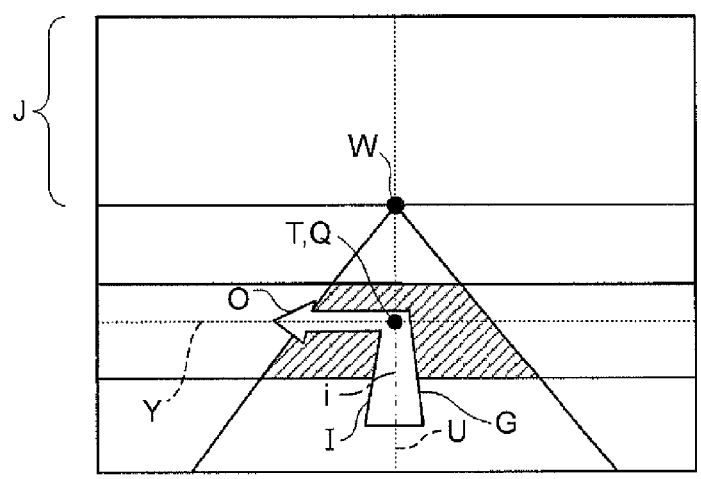
FIG. 4C illustrates a forward image in a second display state.

In the second display state, the control section 20, though the function of the display control section 21c, sets the position of superimposition of the guide image G in the forward image such that the guide image G is present on the image of the guide intersection C. In the embodiment, the control section 20 sets the position of superimposition of the guide image G such that the bent point T of the guide image G overlaps a position in the forward image corresponding to the center position Q of the guide intersection C. FIG. 4C illustrates a forward image in the second display state. As illustrated in the drawing, the guide image G is superimposed on the image of the guide intersection C.

In the configuration described above, the display state on the display 45 is brought into the first display state when the remaining distance S to the guide intersection C is larger than the threshold $S_{th}$, that is, the image of the guide intersection C is small in the forward image. In the first display state, the control section 20 does not superimpose the guide image G on the image of the guide intersection C, but superimposes the guide image G on a portion of the forward image other than the image of the guide intersection. Thus, it is possible to secure the size of the guide image G, without being constrained by the size of the image of the guide intersection C, when the remaining distance S to the guide intersection C is larger than the threshold $S_{th}$. Thus, the travel direction at the guide intersection C can be reliably recognized.

On the other hand, the display state on the display 45 is brought into the second display state when the remaining distance S to the guide intersection C is equal to or less than the threshold $S_{th}$, that is, a large image of the guide intersection C can be visually recognized in the forward image. In the second display state, the control section 20 superimposes the guide image G on the image of the guide intersection C in the forward image. Thus, the exit road, an image of which is located ahead in the travel direction at the guide intersection C, can be easily recognized by contrasting the image of the guide intersection C in the forward image and the guide image G with each other. That is, the exit road at the guide intersection C can be recognized in a situation where the driver can clearly recognize the image of the guide intersection C in the forward image or the actual scene.

Further, guidance on the travel direction at the guide intersection C can be provided in a display manner that is suitable for the remaining distance S to the guide intersection C by causing a transition from the first display state to the second display state. In the first display state, the guide image G is not superimposed on the image of the guide intersection C in the forward image. Thus, the guide image G superimposed on a portion of the forward image other than the image of the guide intersection C can be visually recognized without confusion, when the remaining distance S to the guide intersection C is larger than the threshold $S_{th}$. In the second display state, similarly, the guide image G is not superimposed on a portion of the forward image other than the image of the guide intersection C. Thus, the guide image C superimposed on the image of the guide intersection C in the forward image can be visually recognized without confusion, when the remaining distance S to the guide intersection C is equal to or less than the threshold $S_{th}$.

Further, the image of the guide intersection C and the travel direction at the guide intersection C can be recognized as correlated with each other in the forward image in either of the first display state and the second display state. That is, the position of the guide intersection C and the travel direction at the guide intersection C can be recognized as correlated with each other continuously even if a transition is made from the first display state to the second display state. Further, a transition from the first display state to the second display state allows recognizing that the remaining distance S to the guide intersection C has become shorter.

In addition, since the guide image G in the first display state and the guide image G in the second display state are analogous to each other, it is possible to intuitively recognize that the guide image G provides guidance on the same travel direction at the same guide intersection C continuously even if a transition is made from the first display state to the second display state. Since the guide image G in the second display state is an image obtained by enlarging the guide image G in the first display state, the guide image G can be easily contrasted with the image of the guide intersection C which has become larger in the second display state.

Further, in the first display state, the control section 20 makes the length. L of the connection line image R shorter as the remaining distance S to the guide intersection C becomes shorter. Since the length of the connection line image R is made shorter in advance in the first display state, an impression that the connection line image R vanishes at the timing of a transition from the first display state to the second display state can be lessened. Since the length L of the connection line image R is varied in a one-dimensional direction on the plane of projection of the forward image, the length L of the connection line image R can be easily recognized in the forward image. Thus, the remaining distance S to the guide intersection C can be easily recognized. In addition, it is possible to ideologically correlate the fact that the remaining distance S to the guide intersection C becomes shorter and the fact that the length L of the connection line image R becomes shorter, which allows ideologically recognizing that the remaining distance S becomes shorter as the length of the connection line image R becomes shorter. Further, the image of the guide intersection C and the guide image G, which are connected to each other by the connection line image R, are caused to approach each other by making the length L of the connection line image R shorter. Thus, the connection between the image of the guide intersection C and the guide image G can be emphasized as the remaining distance S to the guide intersection C becomes shorter, which allows ideologically recognizing that the timing to cause the vehicle to travel in the travel direction represented by the guide image G at the guide intersection C is drawing near, that is, the remaining distance S to the guide intersection C is becoming shorter. In addition, the connection line image R is present between the image of the guide intersection C and the guide image G, and therefore the remaining distance S to the guide intersection C can be recognized without moving the line of vision away from a location between the image of the guide intersection C and the guide image G. Further, as illustrated in FIG. 3B, the amount of decrease in length L of the connection line image R per unit amount of decrease in remaining distance S is increased as the remaining distance S becomes shorter. Therefore, the fact that the remaining distance S becomes shorter can be expressed more emphatically as the remaining distance S becomes shorter.

In addition, if the guide image G superimposed above the image of the guide intersection C is descended in advance toward the image of the guide intersection C in the first display state, an impression can be lessened that the guide image G is abruptly descended onto the image of the guide intersection C at the timing of a transition from the first display state to the second display state. In addition, the guide image G reaches a location on the image of the guide intersection C in the second display state after the guide image G is gradually descended in the first display state, which allows intuitively recognizing that guidance on the travel direction at the same guide intersection C is continuously provided. In addition, as the remaining distance S becomes shorter in the first display state, the image of the guide intersection C and the guide image G are arranged vertically at closer positions in the forward image, which makes it possible to easily contrast the image of the guide intersection C and the travel direction represented by the guide image G with each other. In addition, the fact that the remaining distance S to the guide intersection C becomes shorter can be easily recognized in correlation with the fact that the height of the guide image G becomes smaller.

Further, in the first display state, the control section 20 superimposes the guide image G on the forward image such that the size of the guide image G becomes larger as the remaining distance S becomes shorter. This attracts attention to the guide image G more strongly as the remaining distance S to the guide intersection C becomes shorter in the first display state. Further, the length L of the connection line image R becomes shorter contrastively as the size of the guide image G becomes larger, which allows more strongly recognizing that the remaining distance S is becoming shorter. Since the guide image G in the second display state is an image obtained by enlarging the guide image G in the first display state, in addition, the size of the guide image G, which has become larger in the first display state, can be caused to continuously become larger at the time of a transition to the second display state. Thus, a smooth transition can be made from the first display state to the second display state. Accordingly, it is possible to intuitively recognize that guidance on the travel direction at the same guide intersection is continuously provided at the time of a transition from the first display state to the second display state.

In addition, in the second display state, the control section 20 superimposes the guide image G on the forward image such that the size of the guide image G becomes larger as the remaining distance S becomes shorter. This allows the size of the guide image G to also become larger so as to follow an increase in size of the image of the guide intersection C as the remaining distance S becomes shorter in the second display state. Thus, it is possible to prevent the size of the image of the guide intersection C and the size of the guide image G, which is superimposed on the image of the guide intersection C, from deviating from each other to make it difficult to contrast the image of the guide intersection C and the travel direction represented by the guide image G with each other.

In addition, in the first display state, the control section 20 superimposes the shape image M, which represents the shape of the connected roads connected to the guide intersection C, on the forward image, and superimposes the guide image G on the forward image such that the guide image G represents on the shape image M an entry road for entry into the guide intersection C and an exit road for exit from the guide intersection C. This allows easily recognizing which roads, among the connected roads connected to the guide intersection C, are the entry road and the exit road in the first display state.

In the first display state, further, the viewability of the guide image G on the base image B can be secured, without depending on the color of the forward image, by superimposing the guide image G on the base image B. In the second display state, on the other hand, the guide image G is directly superimposed on the image of the guide intersection C without being superimposed on the base image B. This allows the guide image G and the image of the guide intersection C to be directly contrasted with each other, which allows easily recognizing the travel direction represented by the guide image G.

Further, in the first display state, the control section 20 superimposes the connection line image R on the forward image such that the tilt of the center line r of the connection line image R in the width direction in the forward image is kept constant. This keeps the direction in which the length L of the connection line image R becomes shorter constant, which allows easily recognizing that the connection line image R is becoming shorter. Further, since the direction in which the connection line image R becomes shorter is kept constant, the image of the guide intersection C and the guide image G can be caused to approach each other as the connection line image R becomes shorter. This allows clearly recognizing that the remaining distance S to the guide intersection C is becoming shorter. Further, the guide image G is moved linearly toward the image of the guide intersection C, which allows recognizing that the image of the guide intersection C is present ahead in the direction of movement of the guide image G.

In addition, in the first display state, the control section 20 superimposes the guide image G on the forward image such that the entry portion I is superimposed on the extension line of the center line r of the connection line image R in the width direction in the forward image. This provides the driver with an impression that direct entry to the entry portion I of the guide image G can be made by following the connection line image R in the length direction from the image of the guide intersection C. That is, the entry direction $d_1$ at the guide intersection C can be continuously expressed by the connection line image R and the entry portion I of the guide image G. Further, it is possible to intuitively recognize that the distance before entry into the guide intersection C is becoming shorter by making the length L of the connection line image R, which expresses the entry direction $d_1$ for entry into the guide intersection C together with the entry portion I, shorter in accordance with the remaining distance S.

(2) Intersection Guide Process

Figure 5:
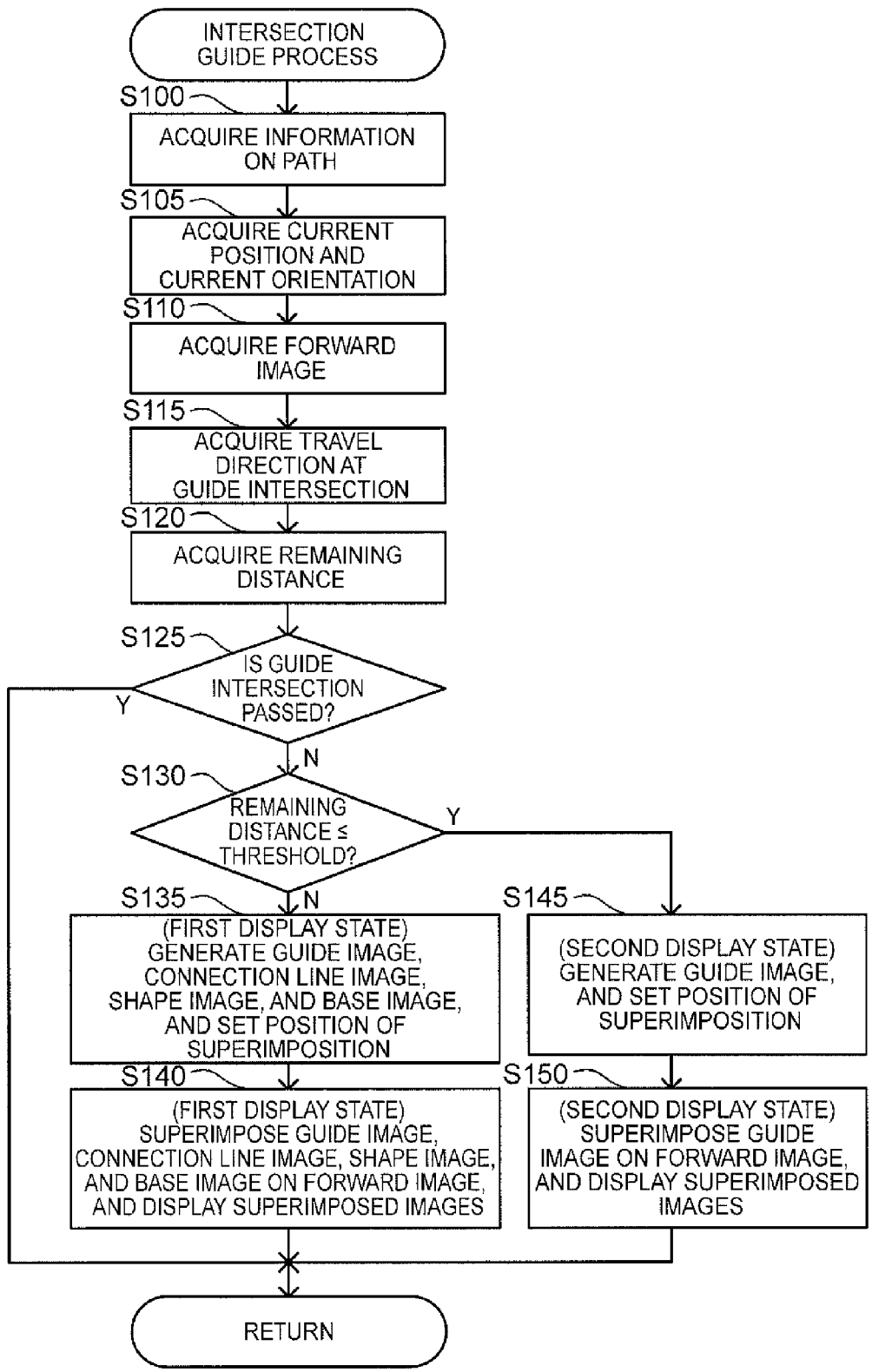
FIG. 5 is a flowchart of an intersection guide process.

FIG. 5 is a flowchart of an intersection guide process. The intersection guide process is a process in which the display state on the display 45 is updated each time the remaining distance S from the vehicle to the guide intersection C is updated. First, the control section 20, through the function of the path information acquisition section 21a, acquires information on a path (step S100). That is, the control section 20 searches for an expected travel path for reaching a destination location on the basis of the map information 30a to acquire information indicating the expected travel path. Next, the control section 20, through the function of the travel direction acquisition section 21b, acquires the current position and the current orientation of the vehicle (step S105). Further, the control section 20 through the function of the display control section 21c, acquires a forward image (step S110).

Next, the control section 20, through the function of the display control section 21c, acquires a travel direction at a guide intersection C (step S115). First, the control section 20 specifies an intersection that the vehicle travels through next, among intersections on the expected travel path, a turning angle θ of which is equal to or more than a threshold, as the guide intersection C. The turning angle θ is an angle formed by the exit direction $d_2$ with respect to the entry direction $d_1$ for entry into the intersection. The control section 20 then acquires an entry direction $d_1$ and an exit direction $d_2$ at the guide intersection C as the travel direction at the guide intersection C on the basis of the direction of an entry road for entry into the guide intersection C and the direction of an exit road for exit from the guide intersection C. Next, the control section 20, through the function of the display control section 21c, acquires a remaining distance S to the guide intersection C (step S120). That is, the control section 20 specifies the linear distance from the current position of the vehicle to the center position Q of the guide intersection C as the remaining distance S.

Next, the control section 20, through the function of the display control section 21c, determines whether or not the vehicle has passed through the guide intersection C (step S125). Specifically, the control section 20 determines that the guide intersection C has been passed through in the case where the remaining distance S is 0. In the case where it is determined that the vehicle has passed through the guide intersection C (step S125: Y), the control section 20 returns to step S100. That is, in the case where the vehicle has already passed through the guide intersection C, the control section 20 determines that it is no longer necessary to continuously provide guidance on the guide intersection C for which guidance on the travel direction has been provided so far, and executes a process for a next guide intersection C.

In the case where it is not determined that the vehicle has passed through the guide intersection C (step S125: N), on the other hand, the control section 20, through the function of the display control section 21c, determines whether or not the remaining distance S to the guide intersection C is equal to or less than the threshold $S_{th}$ (step S130). That is, the control section 20 determines whether or not the degree of approach to the guide intersection C is equal to or more than a threshold. In the case where it is not determined that the remaining distance S to the guide intersection C is equal to or less than the threshold $S_{th}$ (step S130: N), the control section 20, through the function of the display control section 21c, performs a preparation process for performing display in the first display state (step S135). The preparation process for performing display in the first display state will be described below.

First, the control section 20 specifies the bracket of the turning angle θ to which the turning angle θ corresponding to the travel direction at the guide intersection C belongs, and acquires a reference guide image $G_S$ correlated with the specified bracket of the turning angle θ from the reference image DB 30c. Further, the control section 20 specifies the bracket of the connection angle γ of each connected road connected to the guide intersection C, and acquires a reference shape image $M_S$ corresponding to the combination of the brackets of the connection angle γ at which the connected roads are connected from the reference image DB 30c. In addition, the control section 20 references the display setting data 30b to acquire a magnification X of the guide image G corresponding to the remaining distance S. The control section 20 then generates a guide image G and a shape image M matching the remaining distance S by enlarging the reference guide image $G_S$ and the reference shape image $M_S$ with the acquired magnification X. That is, the control section 20 generates a guide image G and a shape image M with a larger size as the degree of approach is larger (as the remaining distance S is shorter). The control section 20 generates a base image B that is different in color from the guide image G and the shape image M.

Further, the control section 20 references the display setting data 30b to acquire a length L of a connection line image R corresponding to the remaining distance S, and generates a connection line image R with the acquired length L. That is, the control section 20 generates a connection line image R with a shorter length L as the degree of approach is larger (as the remaining distance S is shorter). Next, the control section 20 specifies a position in the forward image corresponding to the center position Q of the guide intersection C on the basis of the map information 30a, the current position, the current orientation, and the optical specifications of the camera. 44, and sets a reference line U that extends in the longitudinal direction to pass through the position corresponding to the center position Q of the guide intersection C. The control section 20 then sets the position of superimposition of the connection line image R and the guide image G (the shape image M, the base image B) such that the connection line image R connects between the position corresponding to the center position Q of the guide intersection C and the entry portion I of the guide image G on the reference line U.

Subsequently, the control section 20 causes the display 45 to display the connection line image R, the guide image G, the shape image M, and the base image B, which are generated in the preparation process in step S135, as superimposed at the position of superimposition set in the preparation process in step S135 (step S140). This allows the image of the guide intersection C and the entry portion I of the guide image G to be connected with each other by the connection line image R on the reference line U which passes through the position in the forward image corresponding to the center position Q of the guide intersection C as illustrated in FIGS. 4A and 4B. It is only necessary that the guide image G, the shape image M, and the base image B are eventually superimposed on the forward image, and the order of superimposition is not limited to that in the example discussed above.

In the case where it is determined that the remaining distance S to the guide intersection C is equal to or less than the threshold $S_{th}$ (step S130: Y), on the other hand, the control section 20, through the function of the display control section 21c, performs a preparation process for performing display in the second display state (step S145). That is, the control section 20 acquires a reference guide image $G_S$ correlated with the bracket to which the turning angle θ at the guide intersection C belongs from the reference image DB 30c. Further, the control section 20 references the display setting data 30b to acquire a magnification X of the guide image G corresponding to the remaining distance S. The control section then 20 generates a guide image G matching the remaining distance S by enlarging the reference guide image $G_S$ with the acquired magnification X. That is, the control section 20 generates a guide image G with a larger size as the degree of approach is larger (as the remaining distance S is shorter). Further, the control section 20 sets the position of superimposition of the guide image G such that the bent point T of the guide image G overlaps a position in the forward image corresponding to the center position Q of the guide intersection C.

Next, the control section 20, though the function of the display control section 21c, causes the display 45 to display the guide image G as superimposed at the position of superimposition set as described above (step S150). This allows the guide image G to be superimposed on the image of the guide intersection C as illustrated in FIG. 4C. The display state on the display 45 can be caused to transition in accordance with the remaining distance S, which is gradually decreased, by repeatedly performing the process described above.

(3) Other Embodiments

Around a transition from the first display state to the second display state, the control section 20, though the function of the display control section 21c, may cause the display 45 to display the guide image G as superimposed on the forward image such that the entry portion I of the guide image G is maintained on the same line in the forward image. In a predetermined maintenance period including the ending time of the period in the first display state, the control section 20 maintains the position of the reference line U, on which both the center line i of the entry portion I of the guide image G in the width direction and the center line r of the connection line image R in the width direction are superimposed, on the center line of the forward image in the lateral direction. In a period including the starting time of the period in the second display state, the control section 20 superimposes the center line i of the entry portion I of the guide image G in the width direction on the reference line U maintained on the center line of the forward image in the lateral direction. This maintains the center line i of the entry portion I in the width direction on the reference line U maintained on the center line of the forward image in the lateral direction at the timing of a transition from the first display state to the second display state. As the vehicle approaches the guide intersection C, it is more likely that the guide intersection C is present right ahead of the vehicle. Therefore, a reference value (that is larger than the threshold $S_{th}$) of the remaining distance S may be set, with which it can be considered that the image of the guide intersection C is always present on the center line of the forward image in the lateral direction. In the first display state, a maintenance period may be started, for which the position of the reference line U is maintained on the center line of the forward image in the lateral direction in the case where the remaining distance S to the guide intersection C becomes equal to or less than the reference value, and farther, a transition may be made to the second display state with the position of the reference line U maintained in the case where the remaining distance S becomes equal to or less than the threshold $S_{th}$. This allows the reference line U to be set on the image of the guide intersection C around a transition from the first display state to the second display state. As a matter of course, the control section 20 may start a maintenance period, for which the position of the reference line U is maintained on the center line of the forward image in the lateral direction, in the case where it is determined on the basis of image recognition on the forward image or the like that the image of the guide intersection C is present on the center line of the forward image in the lateral direction.

In addition, in the case where the position of the reference line U on which the entry portion I of the guide image G is superimposed may be varied at the ending time of the first display state, that is, in the case where a maintenance period is not provided in the first display state, the control section 20 may acquire the reference line U at the ending time of the first display state, and set the center line i of the entry portion I of the guide image G in the width direction at the starting time of the second display state on the acquired reference line U. For example, the control section 20 may end the first display state and make a transition to the second display state in the case where the remaining distance S is equal to or less than the threshold $S_{th}$ and the reference line U in the first display state falls within a predetermined distance from the center line of the forward image in the lateral direction. Here, in the case where a position in the forward image in the lateral direction corresponding to the center position Q of the guide intersection C (the reference line U in the first display state) falls within a predetermined distance from the center line of the forward image in the lateral direction, the center position Q of the guide intersection C is already positioned around a location right ahead of the vehicle, and it can be considered that the position of the image of the guide intersection C will not be moved significantly in the lateral direction of the forward image. Thus, in the case where the remaining distance S is equal to or less than the threshold $S_{th}$ and the reference line U in the first display state falls within a predetermined distance from the center line of the forward image in the lateral direction, the center line i of the entry portion I of the guide image G in the width direction can be superimposed on the image of the guide intersection C by making a transition to the second display state, and setting the center line i of the entry portion I of the guide image G in the width direction on the reference line U (the reference line U at the ending time of the first display state).

In this way, by maintaining the entry portion I of the guide image G on the same reference line U in the forward image around a transition from the first display state to the second display state, the driver can recognize that the guide image G represents the entry direction $d_1$ for the same guide intersection C. In addition, the driver can be prevented from feeling uncomfortable about a shake of the entry portion I of the guide image G in the forward image around a transition from the first display state to the second display state. Since the entry portion I is maintained on the reference line U which is the center line of the forward image in the lateral direction around a transition from the first display state to the second display state, in particular, it is possible to provide an impression that the vehicle can be advanced right forward to directly travel in the entry direction $d_1$ indicated by the entry portion I.

In the case where the size of the image of the guide intersection C in the forward image is equal to or more than a predetermined value, the control section 20, through the function of the display control section 21c, may determine that the degree of approach is equal to or more than a threshold. That is, the control section 20 may cause the display state on the display 45 to transition from the first display state to the second display state in the case where the size of the image of the guide intersection C in the forward image is equal to or more than a predetermined value. For example, the control section 20 may determine that the size of the image of the guide intersection C is equal to or more than a predetermined value in the case where the image of the guide intersection C becomes so large that the guide image G is accommodated in the image of the guide intersection C. Further, the control section 20 may determine that the size of the image of the guide intersection C in the forward image is equal to or more than a predetermined value in the case where the size of the image of the guide intersection C is at a predetermined proportion with respect to the size of the guide image G. This prevents the guide image G from being superimposed on the image of the guide intersection C with the size of the image of the guide intersection C being too small for the guide image G. The control section 20 may specify the size of the image of the guide intersection C through image recognition on the forward image. For example, the control section 20 may recognize an image of a stop line formed to stop vehicles at a location before the guide intersection C through image recognition, and specify the size of the image of the guide intersection C on the basis of the position of the image of the stop line recognized through image recognition. That is, the control section 20 may specify that the distance between the position, in the longitudinal direction, of an image of a stop line for the guide intersection C formed on the entry road for entry into the guide intersection C and the position, in the longitudinal direction, of an image of a stop line for the guide intersection C formed on an opposite lane of a driving lane connected to the guide intersection C corresponds to the size of the image of the guide intersection C in the longitudinal direction. The term "opposite lane" refers to a lane (not illustrated in FIG. 2A) which is arranged side by side with the driving lane connected to the guide intersection C in the width direction and on which vehicles travel in the direction opposite to the direction in which vehicles travel on the driving lane.

The control section 20, through the function of the display control section 21c, may set the threshold $S_{th}$ of the remaining distance S on the basis of the shape of the guide intersection C. For example, the control section 20 may specify the size of the guide intersection C on the basis of the map information 30a, and upwardly revise the threshold $S_{th}$ of the remaining distance S in the case where the size of the guide intersection C is larger than the size of the intersection in the average shape. Conversely, the control section 20 may downwardly revise the threshold $S_{th}$ of the remaining distance S in the case where the size of the guide intersection C is smaller than the size of the intersection in the average shape. This makes it possible to advance a transition to the second display state in the case where the size of the image of the guide intersection C in the forward image is large, and to delay the timing of a transition to the second display state in the case where the size of the image of the guide intersection C in the forward image is small. The control section 20 may set the remaining distance S with which it is considered that no image of an intersection other than the guide intersection C is present in the forward image as the threshold $S_{th}$. The threshold $S_{th}$ of the remaining distance S with which it is considered that no image of an intersection other than the guide intersection C is present in the forward image may be set on the basis of the smallest value of the lengths of links indicated by the link data of the map information 30a.

The control section 20, through the function of the display control section 21c, may set the threshold $S_{th}$ of the remaining distance S to be smaller in the case where there is any non-guide target intersection present on the road between the vehicle and the guide intersection C than in the case where there is no non-guide target intersection present on the road between the vehicle and the guide intersection C. That is, the control section 20 may determine whether or not there is any intersection other than the guide intersection C that the vehicle travels through before the guide intersection C on the expected travel path, and downwardly revise the threshold $S_{th}$ in the case where there is any intersection other than the guide intersection C. This makes it possible to delay a transition from the first display state to the second display state in the case where the image of the guide intersection C and the image of a non-guide target intersection are mistakable in the forward image. That is, a transition can be made to the second display state when the vehicle approaches the guide intersection C to such a degree that the image of the guide intersection C and the image of a non-guide target intersection can be, obviously distinguished from each other. In the first display state, the image of the guide intersection C can be clearly represented by the connection line image R (the vertex angle at the lower end), and therefore erroneous recognition of the guide intersection C can be prevented even in the case where the image of the guide intersection C and the image of a non-guide target intersection are mistakable in the forward image.

In addition, in the second display state, the control section 20 may superimpose the guide image G, the size of which has been reduced compared to the original size specified by the magnification X of FIG. 3A, on the image of the guide intersection C in the case where the image of the guide intersection C and the image of a non-guide target intersection are mistakable in the forward image. In the second display state, the image of the guide intersection C can be represented more clearly as the size of the guide image G is smaller, and therefore erroneous recognition of the guide intersection can be prevented.

Further, the control section 20, through the function of the display control section 21c, may set the threshold. $S_{th}$ of the remaining distance S to be smaller in the case where there is any obstacle present on the road between the vehicle and the guide intersection C than in the case where there is no obstacle present on the road between the vehicle and the guide intersection C. For example, in the case where the image of the guide intersection C cannot be recognized in the forward image through image recognition, the control section 20 may determine that there is any obstacle present on the road between the vehicle and the guide intersection C, and downwardly revise the threshold $S_{th}$ of the remaining distance S. This makes it possible to delay a transition from the first display state to the second display state in the case where the image of the guide intersection C is hidden by an image of the obstacle. Here, in the case where a high proportion of the image of the guide intersection C is hidden by the obstacle, it is difficult to recognize the travel direction by contrasting the image of the guide intersection C and the guide image G with each other even if a transition is made to the second display state. By delaying a transition from the first display state to the second display state, in contrast, it is possible to maintain a state in which the travel direction can be understood from the guide image G superimposed on a portion other than the image of the guide intersection C in the first display state. A transition can be made to the second display state when the proportion of the image of the guide intersection C hidden by the obstacle is lowered so that the image of the guide intersection C and the guide image G can be contrasted with each other. This is because as the remaining distance S to the guide intersection C becomes shorter, the size of the image of the guide intersection C in the forward image becomes larger, which increases the possibility that the proportion of the image of the guide intersection C hidden by the obstacle is lowered.

The control section 20, through the function of the display control section 21c, may specify the distance along the way from the current position of the vehicle to the center position Q of the guide intersection C as the remaining distance S. Further, the control section 20 may specify the distance from the current position of the vehicle to a boundary line between the guide intersection C and the entry road as the remaining distance S. The position of the boundary line between the guide intersection C and the entry road can be specified on the basis of the width of a connected road that crosses the entry road at the guide intersection C. The width of the connected road that crosses the entry road can be specified on the basis of the link data of the map information 30a. Further, the control section 20 may specify the position of the image of the guide intersection C (the center position or the position of the boundary line with the entry road) in the forward image through image recognition of the forward image, and specify the remaining distance S on the basis of the position of the image of the guide intersection C.

In the first display state, the control section 20, through the function of the display control section 21c, may establish a state in which both the guide image G and the connection line image R are superimposed on the forward image, and may collectively superimpose an image obtained by coupling the guide image G and the connection line image R to each other on the forward image. The connection line image R may provide the driver with an impression that the image of the guide intersection C and the guide image G are connected to each other, and both ends of the connection line image R in the length direction may not necessarily be present on the image of the guide intersection C and the guide image G. In addition, in the first display state, the control section 20, though the function of the display control section 21c, may superimpose at least the guide image G and the connection line image R, and may not necessarily superimpose the shape image M and the base image B. Further, the control section 20 may not make the size of the guide image G larger as the remaining distance S becomes shorter in at least one of the first display state and the second display state. Further, the guide image G may be switched into a non-analogous image at the timing of a transition from the first display state to the second display state. The guide image G may be an image that allows recognition of an exit road, and may not necessarily include the entry portion I.

Figure 2E:
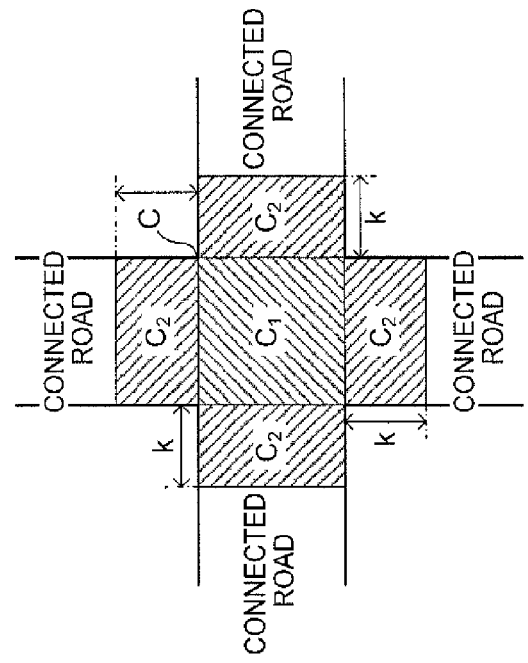
FIG. 2E is a plan view of a road surface at a guide intersection.

Here, the term "image of the guide intersection C" means an image of a road surface at the guide intersection C. FIG. 2E illustrates an example of a road surface at the guide intersection C to which four connected roads are connected. It is only necessary that the road surface at the guide intersection C should include at least an in-intersection road surface $C_1$ (hatched upwardly toward the right) which is a road surface of a region in which the connected roads connected to the guide intersection C overlap each other, and the road surface at the guide intersection C may further include around-intersection road surfaces $C_2$ (hatched downwardly toward the right) which are road surfaces of regions within a predetermined distance k from the in-intersection road surface $C_1$, among the road surfaces of the connected roads. That is, in the second display state, the control section 20 may superimpose the guide image G on an image of any of the around-intersection road surfaces $C_2$ within the predetermined distance k from the in-intersection road surface $C_1$. The guide image G and the image of the guide intersection C can be contrasted with each other on the images of the around-intersection road surfaces $C_2$ within the predetermined distance k from the in-intersection road surface $C_1$ even if the guide image G is not superimposed on the image of the in-intersection road surface $C_1$. For example, an expression such as a road sign (arrow) that provides guidance on the exit direction $d_2$ can be provided on a road surface before an intersection by superimposing the guide image G on the image of the around-intersection road surface $C_2$ on the entry road for entry into the guide intersection C.

In the embodiment, the forward image may be obtained by drawing a forward scene on the basis of the map information 30a. In the case where the forward scene is drawn on the basis of the map information 30a, the guide image G may be drawn at the same time as the forward image. Here, causing the display 45 to display the guide image G as superimposed on the forward scene may be causing the display 45 to display the guide image G to result in superimposition of the guide image G on the forward scene. For example, the display 45 may display at least the guide image G, and may not display the forward image. That is, the display 45 may superimpose the guide image G on the actual forward scene that the driver visually recognizes over the windshield of the vehicle. For example, the display 45 may be a semi-transmissive type that allows the actual forward scene to be seen through the display 45 so that the guide image G is superimposed on the actual forward scene.

The invention claimed is:

1. An intersection guide system comprising:
    a memory storing a program; and
    a CPU that, when executing the program:
        acquires information on a path of a vehicle;
        acquires a travel direction of the vehicle at a guide intersection ahead of the vehicle on the basis of the information on the path;
        causes a display state on a display to transition from a first display state to a second display state in the case where a degree of approach of the vehicle to the guide intersection becomes equal to or more than a threshold;
        in the first display state, causes the display to display a guide image that represents the travel direction as superimposed on a portion of a forward scene ahead of the vehicle above an image of the guide intersection, and causes the display to display a connection line image as superimposed on the forward scene, the connection line image connecting between the image of the guide intersection in the forward scene and the guide image; and
        in the second display state, causes the display to display the guide image as superimposed on the image of the guide intersection in the forward scene, a shape of the guide image superimposed on the image of the guide intersection in the second display state being either (i) congruent to a shape of the guide image displayed on the forward scene in the first display state or (ii) proportionally enlarged relative to the shape of the guide image displayed on the forward scene in the first display state.

2. The intersection guide system according to claim 1, wherein:
    the guide image includes an entry portion that indicates the travel direction on an entry road for entry into the guide intersection based on the information on the path, and an exit portion that indicates the travel direction on an exit road for exit from the guide intersection based on the information on the path; and
    when executing the program, the CPU, around a transition from the first display state to the second display state, causes the display to display the guide image as superimposed on the forward scene such that the entry portion is maintained on the same line in the forward scene.

3. The intersection guide system according to claim 1, wherein, when executing the program, the CPU:
    in the first display state, causes the display to display the connection line image as superimposed on the forward scene such that a length of the connection line image becomes shorter as the degree of approach becomes larger.

4. The intersection guide system according to claim 3, wherein, when executing the program, the CPU:
    in the first display state, causes the display to display the guide image as superimposed on a portion of the forward scene above the image of the guide intersection, and causes the display to display the guide image as superimposed on the forward scene such that the guide image descends toward the image of the guide intersection in the forward scene as the degree of approach becomes larger.

5. The intersection guide system according to claim 1, wherein, when executing the program, the CPU:
    in the first display state, causes the display to display the guide image as superimposed on the forward scene such that a size of the guide image becomes larger as the degree of approach becomes larger.

6. The intersection guide system according to claim 1, wherein, when executing the program, the CPU:
    in the second display state, causes the display to display the guide image as superimposed on the forward scene such that a size of the guide image becomes larger as the degree of approach becomes larger.

7. The intersection guide system according to claim 1, wherein, when executing the program, the CPU:
    determines that the degree of approach is equal to or more than the threshold in the case where a size of the image of the guide intersection in the forward scene is equal to or more than a predetermined value.

8. The intersection guide system according to claim 1, wherein, when executing the program, the CPU:
    in the first display state, superimposes a shape image, which represents a shape of a connected road connected to the guide intersection, on the forward scene, and causes the display to display the guide image as superimposed on the forward scene such that the guide image represents on the shape image an entry road for entry into the guide intersection based on the information on the path and an exit road for exit from the guide intersection based on the information on the path.

9. The intersection guide system according to claim 1, wherein, when executing the program, the CPU:
    in the first display state, superimposes the guide image on a base image, and causes the display to display the base image as superimposed on the forward scene.

10. The intersection guide system according to claim 1, wherein, when executing the program, the CPU:
    sets the threshold of the degree of approach to be larger in the case where there is any non-guide target intersection present on a road between the vehicle and the guide intersection than in the case where there is no non-guide target intersection present on the road between the vehicle and the guide intersection.

11. The intersection guide system according to claim 1, wherein, when executing the program, the CPU:
sets the threshold of the degree of approach to be larger in the case where there is any obstacle present on a road between the vehicle and the guide intersection than in the case where there is no obstacle present on the road between the vehicle and the guide intersection.

12. An intersection guide method comprising:
acquiring information on a path of a vehicle;
acquiring a travel direction of the vehicle at a guide intersection ahead of the vehicle on the basis of the information on the path; and
causing a display state on a display to transition from a first display state to a second display state in the case where a degree of approach of the vehicle to the guide intersection becomes equal to or more than a threshold,
by:
in the first display state, causing the display to display a guide image that represents the travel direction as superimposed on a portion of a forward scene ahead of the vehicle above an image of the guide intersection, and causing the display to display a connection line image as superimposed on the forward scene, the connection line image connecting between the image of the guide intersection in the forward scene and the guide image; and
in the second display state, causing the display to display the guide image as superimposed on the image of the guide intersection in the forward scene, a shape of the guide image superimposed on the image of the guide intersection in the second display state being either (i) congruent to a shape of the guide image displayed on the forward scene in the first display state or (ii) proportionally enlarged relative to the shape of the guide image displayed on the forward scene in the first display state.

13. A non-transitory computer-readable storage medium storing a computer-executable intersection guide program, the program comprising instructions to implement:
a path information acquisition function of acquiring information on a path of a vehicle;
a travel direction acquisition function of acquiring a travel direction of the vehicle at a guide intersection ahead of the vehicle on the basis of the information on the path; and
a display control function of causing a display state on a display to transition from a first display state to a second display state in the case where a degree of approach of the vehicle to the guide intersection becomes equal to or more than a threshold,
wherein:
the display control function causes the computer to:
in the first display state, cause the display to display a guide image that represents the travel direction as superimposed on a portion of a forward scene ahead of the vehicle above an image of the guide intersection, and cause the display to display a connection line image as superimposed on the forward scene, the connection line image connecting between the image of the guide intersection in the forward scene and the guide image; and
in the second display state, cause the display to display the guide image as superimposed on the image of the guide intersection in the forward scene, a shape of the guide image superimposed on the image of the guide intersection in the second display state being either (i) congruent to a shape of the guide image displayed on the forward scene in the first display state or (ii) proportionally enlarged relative to the shape of the guide image displayed on the forward scene in the first display state.

* * * * *